US012534942B2

(12) United States Patent
Hoshino et al.

(10) Patent No.: US 12,534,942 B2
(45) Date of Patent: Jan. 27, 2026

(54) STRIKER

(71) Applicant: Aoyama Seisakusho CO.,LTD., Aichi (JP)

(72) Inventors: Naoki Hoshino, Aichi (JP); Kazuhiro Koga, Aichi (JP); Yuichi Hiroi, Aichi (JP); Keiichiro Masui, Aichi (JP); Mai Uchide, Aichi (JP)

(73) Assignee: Aoyama Seisakusho CO., LTD., Niwa-gun (JP)

( * ) Notice: Subject to any disclaimer, the term of this patent is extended or adjusted under 35 U.S.C. 154(b) by 19 days.

(21) Appl. No.: 18/614,840

(22) Filed: Mar. 25, 2024

(65) Prior Publication Data

US 2024/0328217 A1 Oct. 3, 2024

(30) Foreign Application Priority Data

Mar. 30, 2023 (JP) ................................ 2023-054934

(51) Int. Cl.
*E05B 85/04* (2014.01)
*E05B 83/16* (2014.01)

(52) U.S. Cl.
CPC .............. *E05B 85/04* (2013.01); *E05B 83/16* (2013.01); *E05B 85/045* (2013.01)

(58) Field of Classification Search
CPC ........ E05B 85/04; E05B 85/045; E05B 83/16; E05B 15/025
See application file for complete search history.

(56) References Cited

U.S. PATENT DOCUMENTS 3,572,797 A * 3/1971 Shay ..................... E05B 85/045 292/341.12
3,591,225 A * 7/1971 Hagemeyer ........... E05B 85/045 292/341.12
3,680,902 A * 8/1972 Slattery ................. E05B 85/045 292/341.14
4,798,408 A * 1/1989 Harmon ................ E05B 15/025 292/341.18
4,998,759 A * 3/1991 Peterson ............... E05B 85/045 292/DIG. 53
6,073,980 A * 6/2000 Arabia, Jr. ............ E05B 85/045 292/216

(Continued)

FOREIGN PATENT DOCUMENTS

DE 102006028570 A1 * 12/2007 ........... E05B 15/025
DE 102010010777 A1 * 9/2011 ........... E05B 85/045

(Continued)

*Primary Examiner* — Christine M Mills
*Assistant Examiner* — Faria F Ahmad
(74) *Attorney, Agent, or Firm* — Muncy, Geissler, Olds & Lowe, P.C.

(57) ABSTRACT

A hood striker 1 includes: a plate-shaped base 2 for fixation to a hood of an automobile; a rod-shaped screw member 3 in which a male thread portion 12 is formed at a distal end side, the rod-shaped screw member 3 being disposed perpendicular to a plate surface of the base 2; and an L-shaped hook 4 in which an inserting portion 19 to be slidably inserted into a hook insertion hole 10 drilled in the base 2 is formed at one end, the L-shaped hook 4 including a female thread portion 18 screwed with the male thread portion 12 of the screw member 3 at an other end. A base end of the screw member 3 is rotatably fastened to the base 2.

8 Claims, 7 Drawing Sheets

(56) References Cited

U.S. PATENT DOCUMENTS

| | | | | | |
|---|---|---|---|---|---|
| 6,267,421 | B1 * | 7/2001 | Burton | E05B 77/40 292/DIG. 53 |
| 6,273,480 | B1 * | 8/2001 | Burton | E05B 85/045 292/340 |
| 6,581,990 | B1 * | 6/2003 | Menke | E05B 81/22 292/201 |
| 8,376,425 | B2 * | 2/2013 | Paskonis | E05B 85/045 292/341.15 |
| 11,384,575 | B2 * | 7/2022 | Bellavia | E05B 85/045 |
| 2003/0075934 | A1 * | 4/2003 | Oxley | E05B 81/22 292/341.16 |
| 2005/0236845 | A1 * | 10/2005 | Bird | B62D 25/10 292/216 |
| 2010/0257786 | A1 * | 10/2010 | Rock | E05B 17/0037 49/276 |
| 2012/0067895 | A1 * | 3/2012 | Williams | E05B 15/024 292/341.15 |
| 2012/0161454 | A1 * | 6/2012 | Muramatsu | E05B 77/36 292/141 |
| 2021/0254373 | A1 * | 8/2021 | Suzaki | B60J 5/0433 |
| 2023/0313569 | A1 * | 10/2023 | Bengtsson | E05B 77/08 180/274 |
| 2025/0027334 | A1 * | 1/2025 | Toran Poggio | E05C 1/004 |

FOREIGN PATENT DOCUMENTS

| | | | | | |
|---|---|---|---|---|---|
| DE | 102011015164 | A1 * | 9/2012 | E05B 83/243 |
| EP | 2128360 | A1 * | 12/2009 | E05B 85/045 |
| JP | 2011-94475 | | 5/2011 | |
| KR | 20100019612 | A * | 2/2010 | E05B 85/04 |
| KR | 101438815 | B1 * | 9/2014 | E05B 85/04 |
| WO | WO-2010144911 | A1 * | 12/2010 | E05B 85/045 |

* cited by examiner

STRIKER

CROSS-REFERENCE TO RELATED APPLICATION

This application claims priority from Japanese Patent Application No. 2023-054934 filed with the Japan Patent Office on Mar. 30, 2023, the entire content of which is hereby incorporated by reference.

BACKGROUND

1. Technical Field

The present invention relates to a striker for engaging with a hood lock mounted on a body of a vehicle in a state of being mounted on a back surface of a hood of the vehicle, such as an automobile.

2. Related Art

A striker (what is called a hood striker) has been used as a member for holding a hood of an automobile in a closed state to a body by being engaged with a hood lock mounted on the body of the automobile in a state of being mounted on a back surface of the hood (what is also called "bonnet") of the automobile. Additionally, as the hood striker, as in JP-A-2011-94475, to avoid a situation in which engagement with a hood lock cannot be performed due to displacement of an installation position, there has been known the hood striker that allows adjusting a height of a horizontal member for direct engagement with the hood lock.

FIG. 9 illustrates the hood striker of JP-A-2011-94475. A hood striker 51 includes a receiving plate 52, a rivet nut 53, a screw member 54, and an L-shaped hook 55. The receiving plate 52 is for fixation to a back surface of a hood. The rivet nut 53 includes a female thread portion on an inner peripheral, forms a cylindrical shape, and is perpendicularly fixedly secured to the receiving plate 52. The screw member 54 includes a male thread on an outer periphery, has a bolt shape, and can be screwed with the rivet nut 53. The L-shaped hook 55 includes a perpendicular portion for slidable insertion into an insertion hole of the receiving plate 52 and a horizontal portion that performs attachment to a head portion of the screw member 54.

Additionally, a rotational bearing hole is drilled in a distal end of the horizontal portion of the L-shaped hook 55. The head portion of the screw member 54 is inserted through the rotational bearing hole, and the distal end of the horizontal portion of the L-shaped hook 55 is sandwiched between a support ring 56 having a flange shape and a safety ring 57 formed on the head portion of the screw member 54 to allow rotating the screw member 54 with respect to the distal end of the horizontal portion of the L-shaped hook 55. The hood striker 51 can adjust a height of the horizontal portion of the L-shaped hook 55 by rotating the screw member 54.

However, while the conventional hood striker 51 as in JP-A-2011-94475 can adjust the height of the L-shaped hook 5, the number of components is many, and it is difficult to inexpensively manufacture the hood striker 51. Moreover, the hood striker 51 has a structure in which the distal end of the horizontal portion of the L-shaped hook 55 is simply sandwiched between the support ring 56 of the screw member 54 and the safety ring 57 to allow rotating the screw member 54 with respect to the horizontal portion of the L-shaped hook 55. Therefore, a rotation strength (a torque) of the screw member 54 is likely to vary (a variation between products) and fluctuate. In a case where the torque for rotating the screw member 54 becomes large, the height adjustment work of the horizontal portion of the L-shaped hook 55 becomes difficult.

An object of the present invention is to provide a striker that solves a problem in the conventional hood striker, has small variation (a variation between products) and fluctuation of a torque to rotate a screw member, facilitates height adjustment work of a horizontal portion of an L-shaped hook, and can be inexpensively manufactured.

SUMMARY

Among the present inventions, an invention is a striker for engaging with a lock disposed in a body of a vehicle in a state of being mounted on a back surface of a block member blocking an opening portion of the vehicle. The striker includes a plate-shaped base, a rod-shaped screw member, and a hook. The plate-shaped base is for fixation to the block member. In the rod-shaped screw member, a male thread portion is formed on at least a distal end side. The rod-shaped screw member is disposed perpendicular to a plate surface of the base. In the hook, an inserting portion to be slidably inserted into a through-hole drilled in the base is formed at one end edge. The hook includes a female thread portion (including a member on which the female thread portion is formed) screwed with the male thread portion of the screw member at the other end edge. A base end of the screw member is rotatably fastened (pivotally attached) to the base.

In another invention, the base end of the screw member is rotatably fastened to the base by a flange-shaped part being formed at the base end of the screw member inserted into the base.

In another invention, a washer having an outer diameter larger than the flange-shaped part is disposed between the flange-shaped part of the base end of the screw member and a back surface of the base.

In another invention, a cone washer (what is called a disc spring) having an outer diameter larger than the flange-shaped part of the screw member is disposed between the back surface of the base and the washer.

In another invention, the hook has a formation part of the female thread portion biased outward with respect to the base.

In another invention, the hook includes a member on which the female thread portion is formed separately from a hook body.

In another invention, the hook includes a circumferential large-diameter portion is formed at an end edge outside the inserting portion of the hook.

According to the invented striker, to adjust the height of the L-shaped hook, design can be facilitated such that a variation (a variation between products) and a fluctuation in a torque when the screw member is rotated decrease. Additionally, with the striker, by the female thread portion screwed with the male thread portion of the screw member being integrally formed with the body of the hook (the hook body), the number of components can be small and the striker can be lightweight.

According to the another striker, not only that the design can be facilitated such that the variation (the variation between the products) and the fluctuation in the torque when the screw member is rotated decrease, but also the number of components can be reduced and manufacturing can be inexpensive.

According to the another striker, by the washer having the outer diameter larger than the flange-shaped part of the screw member is slid with respect to the back surface of the base, the screw member rotates with respect to the base. Accordingly, the variation (the variation between the products) and the fluctuation in the torque when the screw member is rotated are substantially reduced, and therefore, the height adjustment work of the hook can be considerably facilitated.

According to the another striker, the cone washer biases the flange-shaped part of the screw member outside with respect to the base. Therefore, an axial force of the screw member being perpendicularly disposed with respect to the plate surface of the base can be stabilized.

According to the another striker, since a formation part of the female thread portion of the hook is biased outward with respect to the base (that is, a direction away from the base), a situation in which the hook rattles during, for example, running an automobile can be effectively suppressed.

According to the another striker, since the member on which the female thread portion screwed with the male thread portion of the screw member is formed can be separately manufactured from the body of the hook (the hook body), the manufacturing can be facilitated. According to the another striker, in terms of design, since the member on which the female thread portion is formed can be accessed to the base, a height dimension from the base (a projection dimension of the screw member from the base) can be decreased.

According to the another striker, even when the hook is carelessly detached from the hood lock during use, the striker can prevent a situation in which a different member (a part or a member other than the hood lock) is damaged by a distal end outside the inserting portion of the hook with high accuracy.

BRIEF DESCRIPTION OF DRAWINGS

(FIG. 2A is a vertical cross-sectional view, FIG. 2B is an enlarged view of a part α in FIG. 2A, and FIG. 2C is an enlarged view of a part β in FIG. 2A);

(FIG. 3A is a perspective view of an automobile in which the hood striker is mounted on a hood, and FIG. 3B is a vertical cross-sectional view of the mounted part of the hood striker (a vertical cross-sectional view along a front-rear direction of the automobile));

(FIG. 4A is a front view, FIG. 4B is a plan view, and FIG. 4C is a γ-γ cross-sectional view in FIG. 4B);

(FIG. 7A is a front view, and FIG. 7B is a δ-δ cross-sectional view in FIG. 7A);

(FIG. 8A is a front view, and FIG. 8A is a ε-ε cross-sectional view in FIG. 8A)

DETAILED DESCRIPTION

The following describes one embodiment of a hood striker for an automobile as one kind of a striker according to the present invention in detail with reference to the drawings.

<Structure of Hood Striker>

Figure 1:
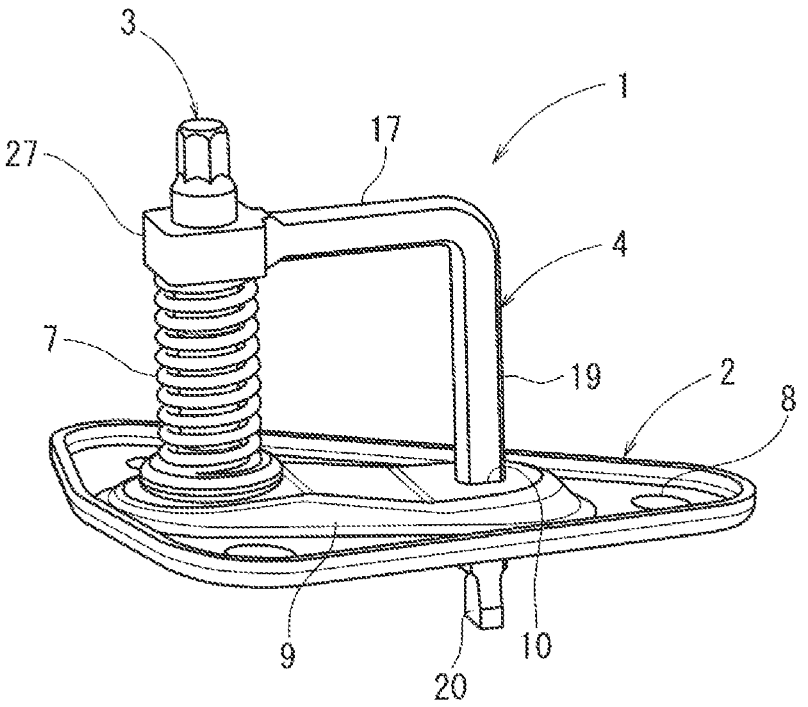
FIG. 1 is an explanatory view (a perspective view) illustrating a hood striker.

FIG. 1 and FIGS. 2A to 2C illustrate the hood striker. As illustrated in FIGS. 3A and 3B, a hood striker 1 is for fixing a hood F to a body by engaging with a hood lock R inside an opening portion W of a body of an automobile V in a state of being mounted on a back surface at a distal end side of the hood F of the automobile V. The hood striker 1 includes a base (a receiving plate) 2 for fixedly securing the hood striker 1 to the back surface of the hood F, a screw member (a bolt) 3 fixedly secured (pivotally attached) to the base 2 to be rotatable, a washer 5 and a cone washer 6 interposed at the pivotally attached part of the screw member 3 with the base 2, an L-shaped hook 4 having a distal end portion screwed with the screw member 3, and a spring member (a coil spring made of metal (iron) having a predetermined spring constant) 7 for biasing a distal end side of the hook 4 outward with respect to the base 2. Additionally, the hood striker 1 has a size of front-rear length×right-left width=approximately 110 mm×approximately 85 mm. As in FIG. 3A, the hood striker 1 is mounted to the hood F of the automobile V for use with the base 2 at an upper side. In the following description, the upper side in FIG. 1 is described as the upper side of the hood striker 1.

The base 2 is for fixation to the hood F of the automobile V using fixing means, such as a bolt, and is formed in an approximately triangular plate shape in plan view by a metal plate (an iron plate) having a predetermined thickness (approximately 1.5 mm). Bending work for reinforcement is performed on its peripheral edge, and screw insertion holes 8, 8 . . . for screwing with the hood F of the automobile V are drilled at a front end edge and right and left rear end edges. On the other hand, a bulge portion 9 is formed at a center (a center in a right-left direction) of the base 2 so as to project to a front surface side (the upper side). At a front end edge of the bulge portion 9 (a right end edge in FIG. 1), a hook insertion hole 10 for insertion of a distal end side of the hook 4 is drilled, and at a rear end edge of the bulge portion 9, a bolt insertion hole 24 for insertion of a base end of the screw member 3 is drilled.

Additionally, the screw member 3 is formed in a vertically elongate columnar shape (integrally formed) having a predetermined length (approximately 85 mm) with metal (iron). At an upper end, a flat head portion 11 having a hexagonal prism shape for fitting a tool (a wrench or the like) is disposed. A truncated cone-shaped portion is formed at a lower side of the head portion 11, and a lower side of the truncated cone-shaped portion is formed in a columnar shape having a constant diameter (approximately 10 mmφ). At an upper portion of the columnar-shaped part, a male thread portion 12 for screwed with the hook 4 is formed. At an upper end edge of the columnar-shaped part, a part where a male thread is not formed is disposed.

Furthermore, at a lower end edge of the screw member 3, an inner flange portion 14 that is thick (a thickness=approximately 5.0 mm) and having a predetermined outer diameter (approximately 24 mmφ) is disposed. Additionally, at a lower end of the screw member 3, an outer flange portion 15 having a predetermined outer diameter (approximately 16 mmφ) is disposed by a caulking process. At a center of a lower end of the screw member 3, a depressed portion 21 having an approximately column shape generated by the caulking process is formed. Between the inner flange portion 14 and the outer flange portion 15, a flat fastening portion 16 having a column shape and a predetermined height (approximately 6 mm) for fastening with the base 2 is formed.

Figure 4A:
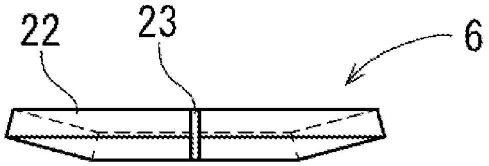
FIGS. 4A to 4C are explanatory views illustrating a cone washer
Figure 4B:
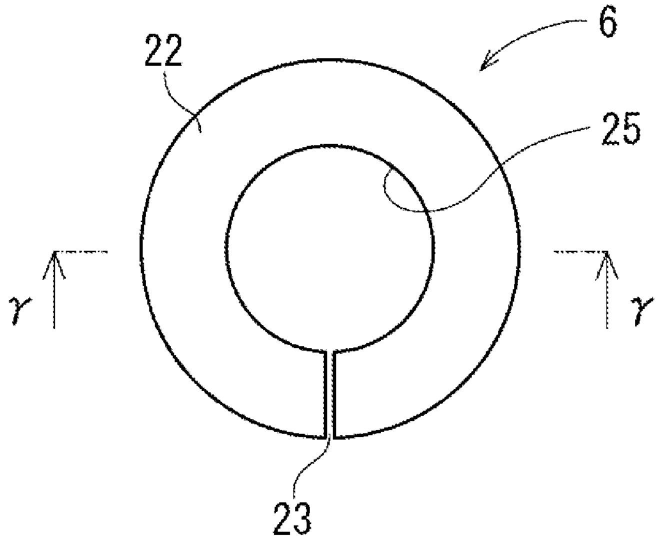
Figure 4C:

Additionally, the washer 5 is what is called a flat washer and formed in a flat doughnut shape having a predetermined outer diameter (approximately 18.0 mm) with a metal plate (an iron plate) having a predetermined thickness (a thickness=approximately 1.7 mm), and a bolt insertion hole having a predetermined inner diameter (approximately 13.0 mm) is formed at a center. Meanwhile, FIGS. 4A to 4C illustrate the cone washer 6. The cone washer 6 functions as a spring washer (what is called a disc spring), and by press forming a metal plate (an iron plate) having a predetermined thickness (a thickness=approximately 1.4 mm), the cone washer 6 is formed in a flat truncated cone shape having a predetermined outer diameter (approximately 19 mmφ) and a predetermined height (a height during no load=approximately 3.0 mm). Additionally, a bolt insertion hole 25 having a predetermined inner diameter (approximately 12.0 mmφ) is formed at a center of a body 22, and a slit 23 having a predetermined width (2.0 mm) is formed from the center in a radiation direction.

Figure 2A:
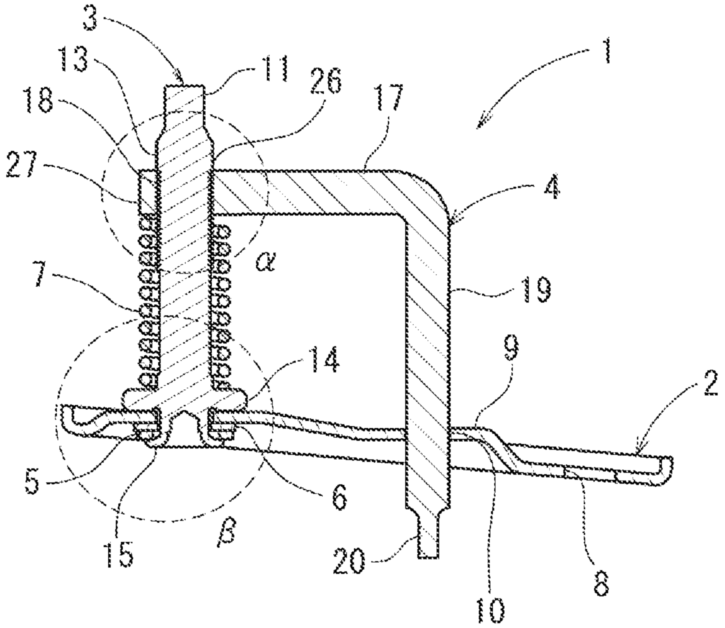
FIGS. 2A to 2C are explanatory views illustrating the hood striker
Figure 2B:
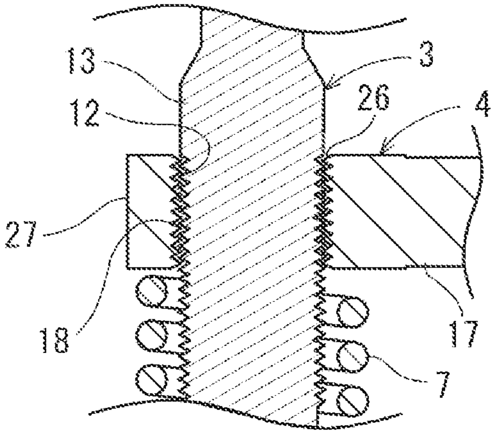
Figure 2C:
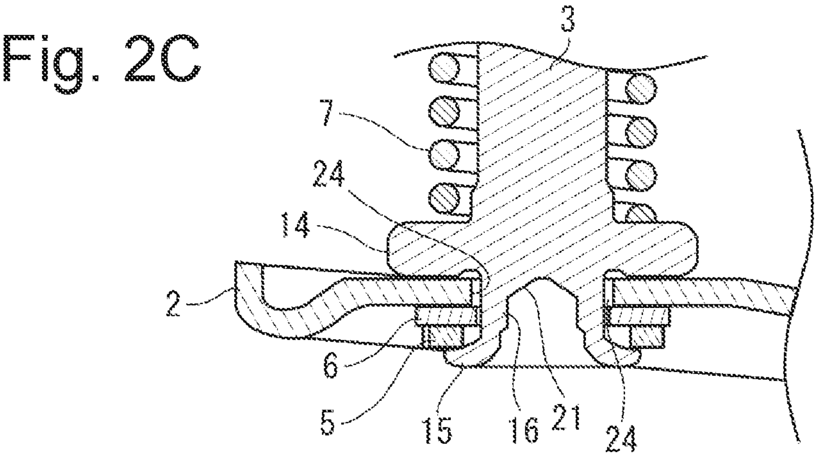
Figure 3A:
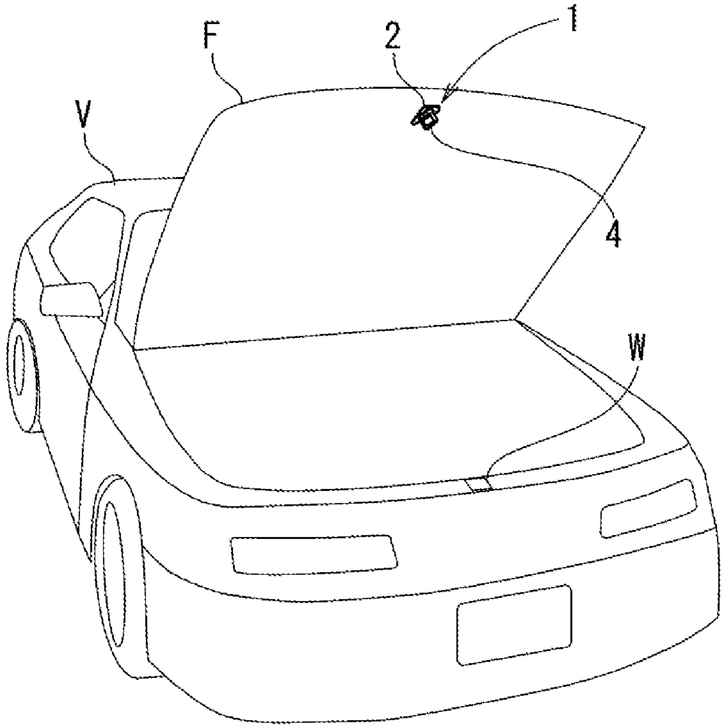
FIGS. 3A and 3B are explanatory views illustrating a use state of the hood striker
Figure 3B:
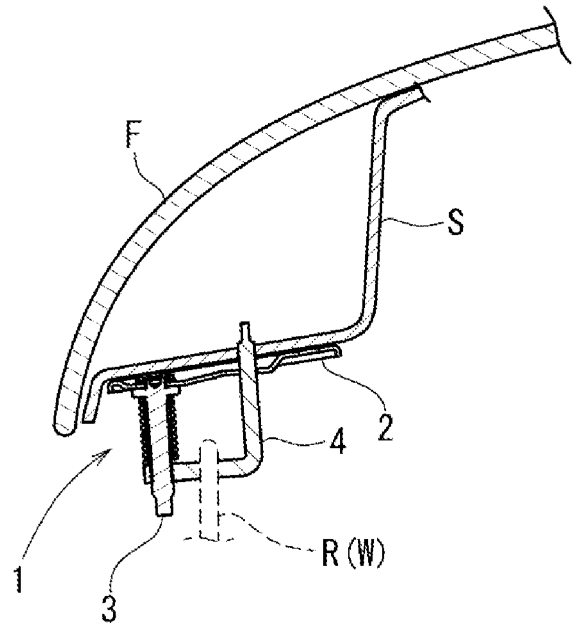

Furthermore, the hook 4 is formed in an approximately L-shape by performing bending work on a quadrangular prism-shaped rod material made of metal (iron) in an approximately right angle shape, a horizontal screw portion 17 for screwed with the screw member 3 is formed at one end side (a left end side of a horizontal part in FIGS. 1 and 2A), and a vertical inserting portion 19 for insertion (being inserted) into the hook insertion hole 10 of the base 2 is formed at the other end side (a lower end side of a vertical part in FIGS. 1 and 2A). At an end edge outside the screw portion 17, a wide screw body 27 having an approximately quadrangular prism shape is formed, in the screw body 27, a bolt insertion hole 26 for insertion of the screw member 3 is drilled, and at an inner surface of the bolt insertion hole 26, a female thread portion 18 to be screwed with the screw member 3 is formed. On the other hand, at an end edge outside the inserting portion 19 of the hook 4, a wide (wider than the other part of the inserting portion 19), thick, plate-shaped collapsing portion 20 is formed by a squash process. Note that the collapsing portion 20 functions as a retainer to prevent a situation of the hook 4 (the inserting portion 19) coming off from the base 2.

<Manufacturing Hood Striker>

To manufacture the above-described hood striker 1, first, the spring member 7 is inserted through the screw member (the screw member where the outer flange portion is not formed) 3 to dispose the spring member 7 on the upper side of the inner flange portion 14. The screw body 27 of the hook 4 is screwed with the male thread portion 12 at an upper end edge of the screw member 3. After that, the base end of the screw member 3 integrated with the hook 4 in this manner is inserted through the bolt insertion hole 24 of the base 2. Additionally, when the base end of the screw member 3 is inserted through the bolt insertion hole 24 of the base 2 in this manner, the inserting portion 19 of the hook 4 is inserted through the hook insertion hole 10 of the base 2.

The cone washer 6 and the washer 5 are inserted through the base end of the screw member 3 inserted through the bolt insertion hole 24 of the base 2 as described above in this order, in the state, a caulking process is performed on the base end of the screw member 3, and the outer flange portion 15 is formed at the base end of the screw member 3 to fasten (namely, pivotally attach) the base end of the screw member 3 to the base 2 to be rotatable. By performing the caulking process on the base end of the screw member 3 in this manner, the cone washer 6 and the washer 5 are fitted to (fitted onto) the fastening portion 16 between a back surface of the base 2 and the outer flange portion 15 in a stacked state. Note that the cone washer 6 is fitted to an upper side of the washer 5 with a bulge surface at a lower side. As described above, by performing the caulking process on the base end of the screw member 3, a pressure in an up-down direction is applied to the cone washer 6 and the washer 5, and therefore, the radially expanded cone washer 6 abuts on the back surface of the base 2 with a wide area.

<Use Method (Action) of Hood Striker>

As in FIGS. 3A and 3B, the hood striker 1 configured as described above is mounted to the back surface (for example, a mounting member S) at a distal end side of the hood F of the automobile V for use. When the hood F is closed, an L-shaped hook 4 is engaged with a hood lock R disposed inside an opening portion W of the body to reliably lock so as to avoid the hood F to carelessly open.

Figure 5A:
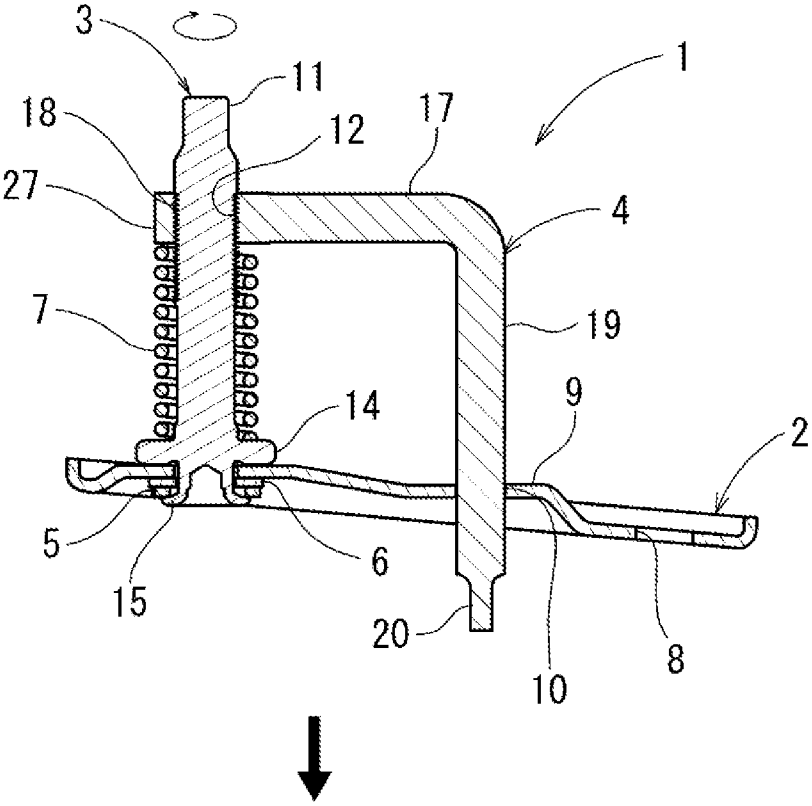
FIGS. 5A and 5B are explanatory views (vertical cross-sectional views) illustrating a use method of the hood striker.
Figure 5B:
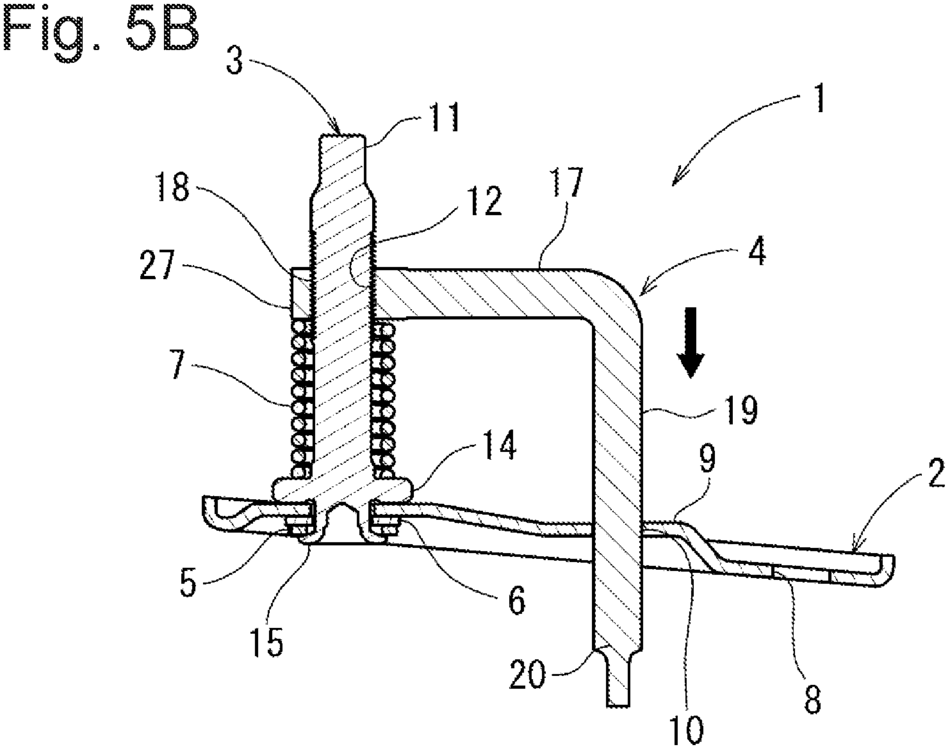

In the hood striker 1 mounted as described above, caused by distortion of the hood F or the like, a situation in which the L-shaped hook 4 does not engage with the hood lock R occurs. In the case, as in FIGS. 5A and 5B, using a tool, such as a wrench, the head portion 11 is rotated to rotate the entire screw member 3 and a height of the hook 4 screwed with the screw member 3 is adjusted, thus ensuring easily disposing the hook 4 at a height engaged with the hood lock R.

In the hood striker 1, at the base end of the screw member 3, the large-diameter washer 5 and the cone washer 6 are interposed between the outer flange portion 15 and the back surface of the base 2, and the cone washer 6 abuts on the back surface of the base 2 at the wide area. Therefore, as described above, when the screw member 3 is rotated with respect to the base 2, a fluctuation of a torque is suppressed to an extremely low level. Additionally, since the cone washer 6 biases the outer flange portion 15 outside with respect to the base 2, an axial force that the screw member 3 attempts to be perpendicular to a plate surface of the base 2 can be stabilized.

<Effects of Hood Striker>

As described above, with the hood striker 1, the plate-shaped base 2 for fixation to the hood F and the male thread portion 12 at the distal end side are formed, the rod-shaped screw member 3 disposed perpendicular to the plate surface of the base 2 and the inserting portion 19 at the one end edge for slidable insertion through the hook insertion hole 10 drilled in the base 2 are formed, the L-shaped hook 4 in which the female thread portion 18 screwed with the male thread portion 12 of the screw member 3 is disposed at the other end edge, and the base end of the screw member 3 is rotatably fastened to the base 2. Accordingly, according to the hood striker 1, to adjust the height of the hook 4, the design can be facilitated such that the variation (the variation between the products) and the fluctuation in the torque when the screw member 3 is rotated decrease. Additionally, with the hood striker 1, since the female thread portion 18 screwed with the male thread portion 12 of the screw member 3 is integrally formed with the body (the hook body) of the hook 4, the number of components is small and the hood striker 1 is lightweight.

With the hood striker 1, by the outer flange portion 15 being formed at the base end of the screw member 3 inserted through the base 2, the base end of the screw member 3 is rotatably fastened to the base 2. Accordingly, not only that design can be facilitated such that the variation (the variation between the products) and the fluctuation in the torque when the screw member 3 is rotated decrease, but also the number of components can be reduced and manufacturing can be inexpensive.

Additionally, with the hood striker 1, the cone washer 6 having the outer diameter larger than the outer flange portion 15 is disposed between the outer flange portion 15 at the base end of the screw member 3 and the back surface of the base 2. By the cone washer 6 sliding while abutting on the back surface of the base 2 at the wide area, the screw member 3 rotates with respect to the base 2. Accordingly, the variation (the variation between the products) and the fluctuation in the torque when the screw member 3 is rotated are substantially reduced, and therefore, the height adjustment work of the hook 4 can be considerably facilitated.

Furthermore, with the hood striker 1, between the back surface of the base 2 and the washer 5, the cone washer (what is called the disc spring) 6 is disposed and the outer flange portion 15 is biased outside with respect to the base 2. Therefore, the axial force of the screw member 3 being perpendicularly disposed with respect to the plate surface of the base 2 can be stabilized.

In addition, with the hood striker 1, since the formation part of the female thread portion 18 of the hook 4 (namely, the formation part of the screw body 27) is biased outward with respect to the base 2 (that is, a direction away from the base 2) by the spring member 7, a situation in which the hook 4 rattles can be effectively suppressed.

Additionally, with the hood striker 1, since the head portion 11 is formed at the upper end of the screw member 3, the screw member 3 can be easily rotated by a tool, such as a wrench, to adjust the height. Furthermore, with the hood striker 1, since the bolt insertion hole 24 is formed at the bulge portion 9 formed at the base 2, even when the base 2 is fixed to the hood F, a situation in which the base end of the screw member 3 contacts the hood F and an obstacle is caused in the rotation of the screw member 3 does not occur.

<Change Example of Hood Striker>

The hood striker according to the present invention is not limited to the above-described aspects of the embodiments by any means, and configurations, such as a material, a shape, a structure, and a size, can be appropriately changed as necessary within the scope not departing from the gist of the present invention.

For example, the hood striker according to the present invention is not limited to the one in which the flange-shaped part is formed by performing the caulking process on the base end of the screw member as in the embodiment. For example, the base end of the screw member may be formed in a columnar shape (namely, a bolt shape) on which a male thread is disposed on its periphery, and a base end of the screw member having the bolt shape may be inserted through the bolt insertion hole of the base and may be tightened with a nut or the like. When it is configured in the manner, between the back surface of the base and the nut or the like, a washer (a flat washer, a cone washer, a spring washer, a washer with teeth, and the like) can be interposed.

Additionally, as in the embodiment, the hood striker according to the present invention is not limited to the one in which, between the back surface of the base and the flange-shaped part formed at the base end of the screw member, one cone washer and one flat washer are stack and interposed. For example, the cone washer or the flat washer alone may be interposed or a plurality of cone washers or flat washers and one or more flat washers or cone washers may be stacked and interposed. In addition, instead of the cone washer, for example, a spring washer and a washer with teeth may be used.

Furthermore, as in the embodiment, the hood striker according to the present invention is not limited to the one with the base having the approximately triangular shape (the planar shape). The shape of the base can be changed appropriately according to the mounting structure with the hood of the automobile. Additionally, the thread engagement part with the screw member of the hook is not limited to be biased outward (outward with respect to the base) by the spring member, and the spring member may be absent. In addition, the spring member biasing the thread engagement part with the screw member of the hook is not limited to the coil spring as in the embodiment and can be changed to a leaf spring or the like.

Figure 6:
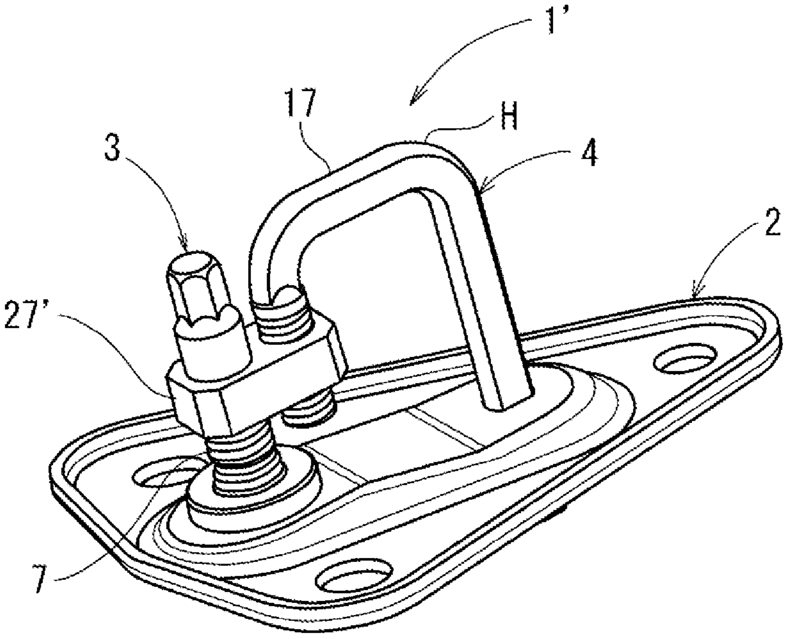
FIG. 6 is an explanatory view (a perspective view) illustrating a change example of the hood striker.

The hood striker according to the present invention is not limited to the one in which the distal end of the thread engagement portion of the hook (a distal end of the outside) is directly screwed with the screw member as in the embodiment (that is, the one in which the screw body on which the female thread portion is formed is integrally disposed with the body of the L-shaped hook). As in FIG. 6, for example, a screw body 27' of the hook 4 may be separately disposed to be screwable with the distal end of the screw portion 17 of the body of the L-shaped hook 4 (a hook body H), and the body of the hook 4 may be indirectly screwed with the screw member 3 via the screw body 27'. Thus, when the screw body 27' is disposed separately from the body of the hook 4, since the screw body 27' and the body of the hook 4 can be separately manufactured, the manufacturing can be facilitated. In terms of design, since the screw body 27' can be accessed to the base 2, a height dimension from the base 2 (a projection dimension of the screw member 3 from the base 2) can be decreased.

Figure 7A:
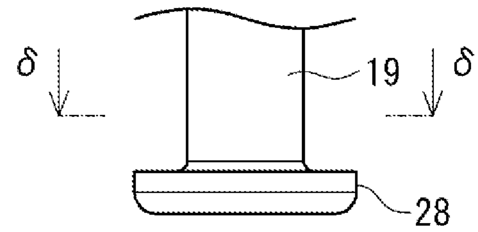
FIGS. 7A and 7B are explanatory views illustrating a change example of a hook
Figure 7B:
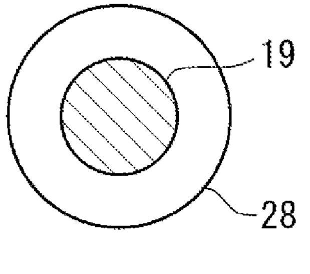
Figure 8A:
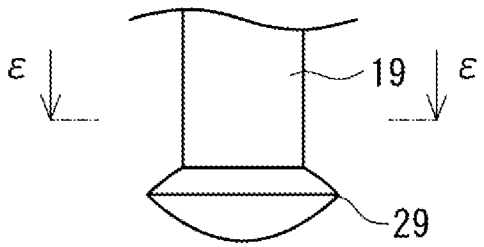
FIGS. 8A and 8B are explanatory views illustrating a change example of the hook
Figure 8B:
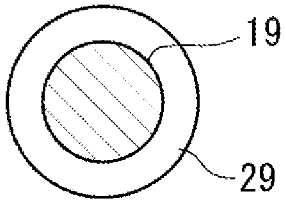
Figure 9:
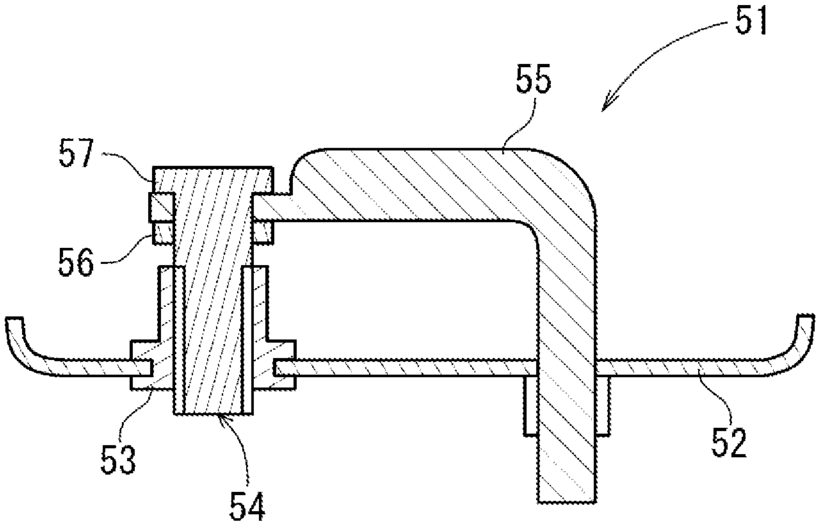
Fig. 9 Related Art
FIG. 9 is an explanatory view (a vertical cross-sectional view) illustrating the conventional hood striker.

On the other hand, as in the embodiment, the hood striker according to the present invention is not limited to the one in which the collapsing portion having the wide and thick plate shape is formed at the end edge (the distal end edge) of the outside (the lower side) of the inserting portion of the hook, but a circumferential large-diameter portion can be formed at an end edge outside the inserting portion of the hook. Additionally, when the circumferential large-diameter portion is formed at the end edge outside the inserting portion of the hook in the manner, as in FIGS. 7A and 7B, the circumferential large-diameter portion can be a shape, such as a large-diameter flange (a flat doughnut shape body) 28 and as in FIGS. 8A and 8B, a large-diameter bulge portion (for example, an upper portion has a truncated cone shape and a lower portion has a spherical surface that is convex downward) 29 formed by a method, such as a rotary caulking process. When the large-diameter flange is formed at the end edge outside the inserting portion of the hook, as in FIG. 7A, an outer peripheral edge outside (a lower side) of the flange can be chamfered in an R shape. In addition, the circumferential large-diameter portion formed at the end edge outside the inserting portion of the hook can be a flat polygonal prismatic-shaped body (for example, a flat hexagonal prism-shaped body and octagonal prism body). As described above, when the circumferential large-diameter portion is formed at the end edge outside the inserting portion of the hook, even when the hook is carelessly detached from the hood lock if by any chance during use, the hood striker does not cause a situation (is extremely less likely to occur) in which a different member (a part or a member other than the hood lock) is damaged (flawed) by the distal end outside the inserting portion of the hook.

INDUSTRIAL APPLICABILITY

Since the hood striker according to the present invention provides the excellent effects as described above, by engagement with the hood lock of the body of the automobile with the hood striker mounted to the back surface of the hood of the automobile, the hood striker can be preferably used as a member for fixing the hood to the body.

DESCRIPTION OF REFERENCE SIGNS

1, 1' . . . Hood striker, 2 . . . Base, 3 . . . Screw member (bolt), 4 . . . Hook, 5 . . . Washer, 6 . . . Cone washer, 7 . . . Spring member, 8 . . . Screw hole, 9 . . . Bulge portion, 10 . . . Hook insertion hole, 11 . . . Head portion, 12 . . . Male thread portion, 13 . . . Shaft portion, 14 . . . Inner flange portion, 15 . . . Outer flange portion, 16 . . . Fastening portion, 17 . . . Screw portion, 18 . . . Female thread portion, 19 . . . Inserting portion, 20 . . . Collapsing portion, 21 . . . Depressed portion, 22 . . . Body, 23 . . . Slit, 24 . . . Bolt insertion hole, 25 . . . Bolt insertion hole, 26 . . . Bolt insertion hole, 27, 27' . . . Screw body, 28 . . . Flange, 29 . . . Bulge portion, 51 . . . Hood striker, 52 . . . Receiving plate, 53 . . . Rivet nut, 54 . . . Screw member, 55 . . . L-shaped hook, 56 . . . Support ring, 57 . . . Safety ring, F . . . Hood, V . . . Automobile, W . . . Opening portion, R . . . Hood lock, S . . . Mounting member, H . . . Hook body

What is claimed is:

1. A striker for engaging with a lock disposed in a body of a vehicle in a state of being mounted on a back surface of a block member blocking an opening portion of the vehicle, comprising:

a plate-shaped base for fixation to the block member;

a rod-shaped screw member having two ends wherein one of the two ends is defined as a distal end and the other of the two ends is defined as a proximal end, in which a male thread portion is formed on at least a side of the distal end, the rod-shaped screw member being disposed perpendicular to a plate surface of the base and being connected to the base on a side of the proximal end of the rod-shaped screw member; and a hook having two end edges in which an inserting portion to be slidably inserted into a through-hole drilled in the base is formed at one of the two end edges, the hook including a female thread portion screwed with the male thread portion of the rod-shaped screw member at the other of the two end edges, wherein a base end of the rod-shaped screw member is rotatably fastened to the base, the base end of the rod-shaped screw member is rotatably fastened to the base by a flange-shaped part being formed at the base end of the rod-shaped screw member inserted into the base, and a washer having an outer diameter larger than the flange-shaped part is disposed between the flange-shaped part of the base end of the rod-shaped screw member and a back surface of the base.

2. The striker according to claim 1, wherein a cone washer having an outer diameter larger than the flange-shaped part of the rod-shaped screw member is disposed between the back surface of the base and the washer.

3. The striker according to claim 1, wherein the hook has a formation part of the female thread portion biased outward with respect to the base.

4. The striker according to claim 1, wherein the hook includes a member on which the female thread portion is formed separately from a hook body.

5. The striker according to claim 1, wherein the hook includes a circumferential large-diameter portion that is formed at the other of the two end edges outside the inserting portion of the hook.

6. A striker for engaging with a lock disposed in a body of a vehicle in a state of being mounted on a back surface of a block member blocking an opening portion of the vehicle, comprising:

a plate-shaped base for fixation to the block member;

a rod-shaped screw member having two ends wherein one of the two ends is defined as a distal end and the other of the two ends is defined as a proximal end, in which a male thread portion is formed on at least a side of the distal end, the rod-shaped screw member being disposed perpendicular to a plate surface of the base and being connected to the base on a side of the proximal end of the rod-shaped screw member; and a hook having two end edges in which an inserting portion to be slidably inserted into a through-hole drilled in the base is formed at one of the two end edges, the hook including a female thread portion screwed with the male thread portion of the rod-shaped screw member at the other of the two end edges, wherein a base end of the rod-shaped screw member is rotatably fastened to the base, and the hook has a formation part of the female thread portion biased outward with respect to the base.

7. The striker according to claim 6, wherein the hook includes a member on which the female thread portion is formed separately from a hook body.

8. The striker according to claim 6, wherein the hook includes a circumferential large-diameter portion that is formed at the other of the two end edges outside the inserting portion of the hook.

* * * * *